United States Patent
Arafune

(10) Patent No.: US 8,660,341 B2
(45) Date of Paten: Feb. 25, 2014

(54) COLOR CONVERTING APPARATUS, COLOR CONVERTING METHOD, AND COLOR CONVERTING PROGRAM

(75) Inventor: Akira Arafune, Tokyo (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 13/112,176

(22) Filed: May 20, 2011

(65) Prior Publication Data

US 2012/0051632 A1 Mar. 1, 2012

(30) Foreign Application Priority Data

May 27, 2010 (JP) .............................. P2010-121670

(51) Int. Cl.
*G06K 9/00* (2006.01)
(52) U.S. Cl.
USPC .......................................... 382/164
(58) Field of Classification Search
USPC ................ 382/162–167, 173, 282, 274; 358/518–520, 1.9; 345/589–592; 348/62, 575, 577, 582, 612; 715/723
See application file for complete search history.

(56) References Cited

U.S. PATENT DOCUMENTS

| | | | | |
|---|---|---|---|---|
| 6,931,151 B2 * | 8/2005 | Weast | ........................... | 382/162 |
| 7,394,468 B2 * | 7/2008 | Hofman et al. | ............... | 345/589 |
| 7,860,311 B2 * | 12/2010 | Chen et al. | .................... | 382/173 |
| 8,154,778 B2 * | 4/2012 | Patton et al. | .................. | 358/518 |
| 8,345,338 B2 * | 1/2013 | Jeong et al. | ................. | 359/222.1 |
| 8,422,071 B2 * | 4/2013 | Shimamura et al. | ........... | 358/1.9 |
| 2001/0053246 A1 * | 12/2001 | Tachibana et al. | ............. | 382/162 |
| 2012/0147163 A1 * | 6/2012 | Kaminsky | ....................... | 348/62 |

FOREIGN PATENT DOCUMENTS

| | | |
|---|---|---|
| JP | 2004 246739 | 9/2004 |
| JP | 2004 272516 | 9/2004 |

* cited by examiner

*Primary Examiner* — Ishrat I Sherali
(74) *Attorney, Agent, or Firm* — Frommer Lawrence & Haug LLP; William S. Frommer

(57) ABSTRACT

A color converting apparatus includes: an input section acquiring image data of moving image content from each frame; an object detecting section detecting an object from the image in each frame; a confusing region extracting section extracting a confusing region having a confusing hue from the detected object; and a color converting section performing color conversion at least on a region including the confusing region in a particular frame or another frame including the object from which the confusing region has been extracted, when the confusing region is extracted from the particular frame.

7 Claims, 5 Drawing Sheets

FIG.3
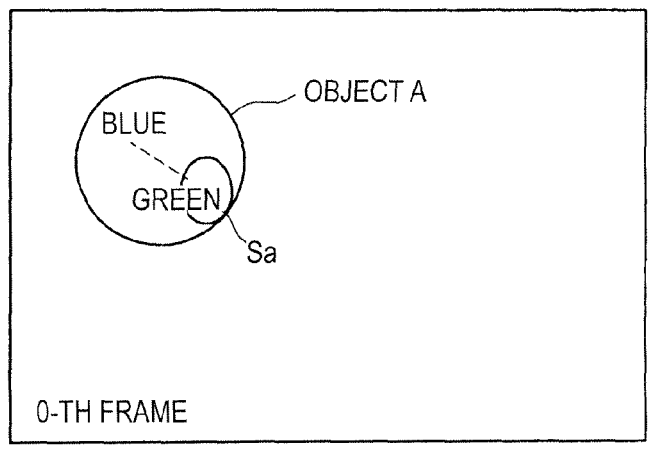
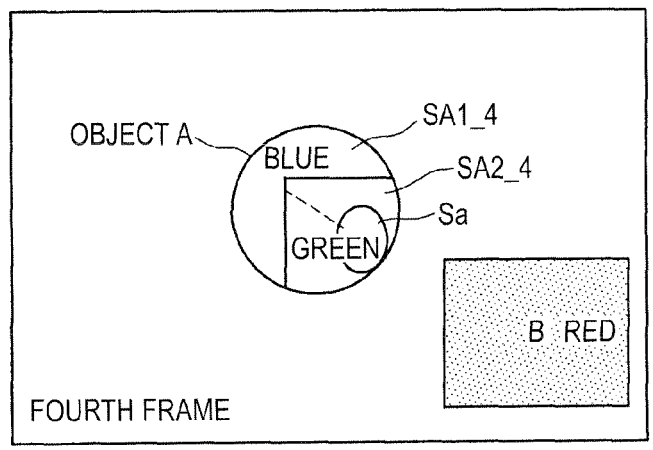
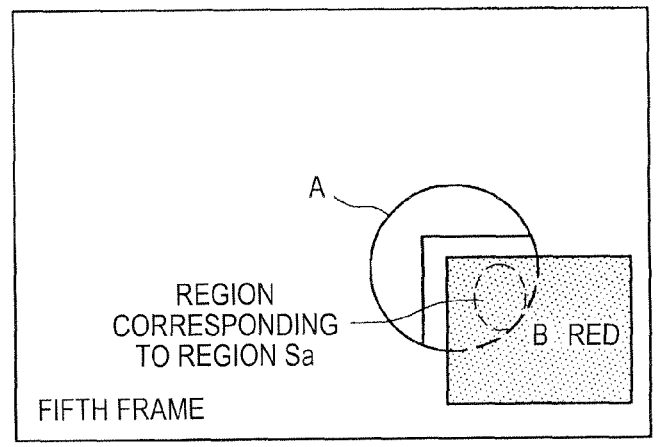

FIG.5

| FRAME NO. | 0 | 1 | 2 | 3 | 4 | 5 | 6 | 7 |
|---|---|---|---|---|---|---|---|---|
| CONFUSING REGION PRESENCE FLAG | 0 | 0 | 0 | 0 | 1 | 0 | 0 | 0 |
| RESULT OF CONFUSING REGION EXTRACTION | NONE | NONE | NONE | NONE | A,B | NONE | NONE | NONE |
| RESULT OF TRACKING OF OBJECT A | 1 | 1 | 1 | 1 | 1 | 1 | 1 | 0 |
| RESULT OF TRACKING OF OBJECT B | 0 | 0 | 0 | 0 | 1 | 1 | 1 | 1 |

COLOR CONVERTING APPARATUS, COLOR CONVERTING METHOD, AND COLOR CONVERTING PROGRAM

TECHNICAL FIELD

The preset technology relates to a color converting apparatus, a color converting method, and a color converting program.

BACKGROUND

For example, JP-A-2004-272516 and JP-A-2004-246739 (Patent Documents 1 and 2) disclose proposed methods of presenting an image to a person having normal color vision in which region having undistinguishable hues in the same image frame are extracted and subjected to color conversion to present the image to the person.

SUMMARY

Either of the techniques disclosed in the above-listed documents is intended for color converting processes performed within still image frames. When those techniques are used for processing moving image content, the content may be dynamically switched between a state in which it suffers from confusion between hues and a state in which it suffers from no confusion between hues because objects of moving image content move each time the content changes from one frame to another. Under the circumstance, a region having a confusing color of one and the same object may be differently processed in some cases. Specifically, color conversion may be performed on the region of the object in a certain frame because there is another region with which color confusion can occur, whereas color conversion may not be performed in another frame in which the region having a confusing color included in a preceding frame has disappeared. As a result, moving image data obtained by a color converting process may have problems such as discontinuous transitions between hues of one and the same object and inconsistent color conversion on the same object belonging to an image sequence. When color conversion is performed in such a manner, a problem arises in that a user may have a feeling of disorder and that unnaturalness of an image may be exaggerated.

Under the circumstance, it is desirable to provide a novel and improved color converting apparatus, color converting method, and color converting program which allow an optimal color converting process to be performed on moving image content.

According to an embodiment of the present technology, there is provided a color converting apparatus including an input section acquiring image data of moving image content from each frame, an object detecting section detecting an object from the image in each frame, a confusing region extracting section extracting a confusing region having a confusing hue from the detected object, and a color converting section performing color conversion at least on a region including the confusing region in a particular frame or another frame including the object from which the confusing region has been extracted, when the confusing region is extracted from the particular frame.

The color converting apparatus according to the embodiment may include a color converting process storing section storing the content of the color converting process performed on the particular frame. The color converting section may use the process content stored in the color converting process storing section when performing the color conversion on the other frame.

The color converting apparatus according to the embodiment may include an object storing section storing an object in the particular frame on which the color conversion has been performed. The color converting section may perform the color conversion on the other frame when the object stored in the object storing section exists in the other frame.

The confusing region extracting section may extract the confusing regions having hues which can be confused with each other from respective objects among a plurality of objects detected by the object detecting section. The apparatus according to the embodiment may include a confusing region bearing object extracting section extracting an object to be subjected to color conversion from among the plurality of objects based on the size of the confusing region in each of the objects. The color converting section may perform color conversion on the object extracted by the confusing region bearing object extracting section among the plurality of objects.

The color converting section may perform the color conversion on the confusing regions having hues which can cause mutual confusion between objects such that the confusing regions do not reside on the same confusing line on an xy chromaticity diagram.

According to another embodiment of the present technology, there is provided a color converting method including the steps of acquiring image data of moving image content from each frame, detecting an object from the image in each frame, extracting a confusing region having a confusing hue from the detected object, performing color conversion at least on a region including the confusing region in a particular frame when the confusing region is extracted from the particular frame, and performing color conversion at least on a region including the confusing region in another frame including the object from which the confusing region has been extracted.

According to still another embodiment of the present technology, there is provided a program for causing a computer to function as means for acquiring image data of moving image content from each frame, means for detecting an object from the image in each frame, means for extracting a confusing region having a confusing hue from the detected object, and means for performing color conversion at least on a region including the confusing region in a particular frame or another frame including the object from which the confusing region has been extracted, when the confusing region is extracted from the particular frame.

The embodiments of the present technology makes it possible to provide a color converting apparatus, a color converting method, and a color converting program which allow an optimal color converting process to be performed on moving image content.

BRIEF DESCRIPTION OF THE DRAWINGS

FIG. 3 is illustrations of frames of a moving image showing sequential movement of an object;

FIG. 5 is a table showing the state of a confusing region presence flag, the result of confusing region extraction performed by a confusing region extracting portion, and the result of tracking of the objects A and B performed by an object detecting portion, in each of frames including those shown in FIG. 3.

DESCRIPTION OF EMBODIMENT

Figure 1:
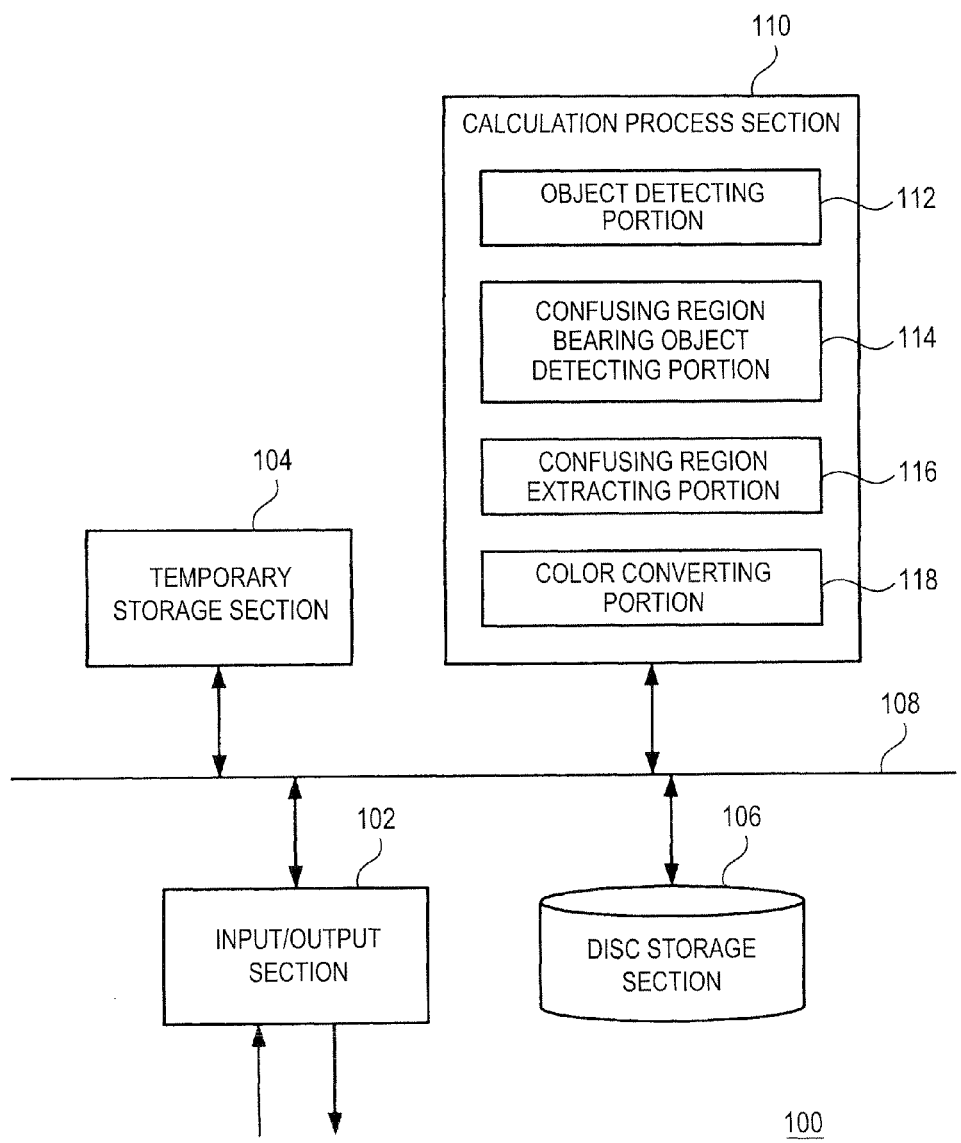
FIG. 1 is a schematic diagram showing a configuration of a color converting apparatus according to an embodiment of the present technology.

An embodiment of the present technology will now be described in detail with reference to the accompanying drawings. The following items will be described in the order listed.
1. Background of the Embodiment
2. Exemplary Configuration of Color Converting Apparatus
3. Exemplary Color Converting Process

[1. Background of Embodiment]

There is a wide variety of the color vision of human-beings, including trichromatic (C-type) color vision and P- and D-type color visions which have been called color blindness or color weakness. When color image contents are created or when colors are reproduced by color display devices which are typically color monitors and liquid crystal displays, it is assumed that the contents and colors will be viewed by people having the C-type color vision who are the majority of potential viewers. Therefore, color difference information is sometimes missed by people having the P- or D-type color vision.

Color vision types will now be described. According to CUDO (Color Universal Design Organization) which is an NPO (Nonprofit Organization), one out of 20 male Japanese and one out of 500 female Japanese have color vision different from normal color vision, and the number of such people in Japan is estimated to total at 3 million or more. It is sometimes difficult for people having such a problem in color vision or people having color weakness to properly recognize colors on a guide map in a public place, a route map, an electric signboard, or an operation screen of an electronic apparatus. For example, a graph plotted using red and green is obviously difficult to understand for people having a type of color weakness which makes it difficult to distinguish between red and green. According to CUDO, color vision characteristics are classified into types (1) to (6) as described below depending on which of the cones of a retina has abnormality. Specifically, there are (1) people having normal (C-type) color vision, (2) people having color weakness against red (P-type). (3) people having color weakness against green (D-type), (4) people having color weakness against blue (T-type), (5) people having color weakness against a plurality of colors (A-type), and (6) people having total color blindness (U-type).

Abnormality of one type of cones is not necessarily associated with any of the color weakness types (2) to (4) When the visibility of a certain color is low, the abnormality of color vision may affect the visibility of other colors depending on the degree of abnormality. For example, a person having color weakness categorized as the P-type may have difficulty in distinguishing between red and green.

Under the circumstance, an image presenting method has been disclosed, which is primarily applied to dichromatic color vision in its exemplary applications, the method including the step of performing color conversion on regions having hues indistinguishable with each other and belonging to the same image frame when presenting an image to a person having color vision other than the C-type as described above. However, when the method is used to process moving image content as described above, color conversion may be differently performed on a region in the same object. Specifically, color conversion may be performed on the region of the object in a certain frame because there is another region with which color confusion can occur, whereas color conversion may not be performed in another frame in which the region having a confusing color included in a preceding frame has disappeared.

According to the present embodiment, even when a certain frame of moving image content includes no region having a confusing color, color conversion is performed if a reference frame, e.g., the frame preceding the frame of interest, includes a region having a confusing region. Thus, the image is prevented from giving a feeling of disorder to a user. Since a color residing on a confusing line of an xy chromatic diagram is difficult to distinguish from another color on the same line for a person with a color vision handicap, correction is carried out to move the color to a position away from the confusing line.

[2. Exemplary Configuration of Color Converting Apparatus]

A configuration of a color converting apparatus 100 according to the embodiment of the present technology will now be described with reference to FIG. 1. As shown in FIG. 1, the color converting apparatus 100 includes an input/output section 102, a temporary storage section 104, a disc storage section 106, and a calculation process section 110. Those blocks are connected through a bus 108. The input/output section 102 functions as an image input section to which original image data is input and an image output section outputting image data obtained by a color converting process to a display system such as a liquid crystal display panel. The temporary storage section 104 is a storage section constituted by a volatile memory, a non-volatile memory, or the like. The disc storage section 106 is a storage section constituted by a hard disc or the like. The primary storage section 104 and the disc storage section 106 are provided for storing image data and the content of a color converting process. Programs to be executed by the calculation process section 110 are saved in the disc storage section 106. The content of processing programs saved in the disc storage section 106 is deployed in the temporary storage section 104. The calculation process section 110 is constituted by a central processing unit (CPU) or the like, and the section performs a process of determining the programs deployed in the temporary storage section 104 to perform a color converting process. As a result of the execution of the program determining process, the calculation process section 110 functions as an object detecting portion 112, a confusing region bearing object extracting portion 114, a confusing region extracting portion 116, and a color converting portion 118.

[3. Exemplary Color Converting Portion]

Figure 2:
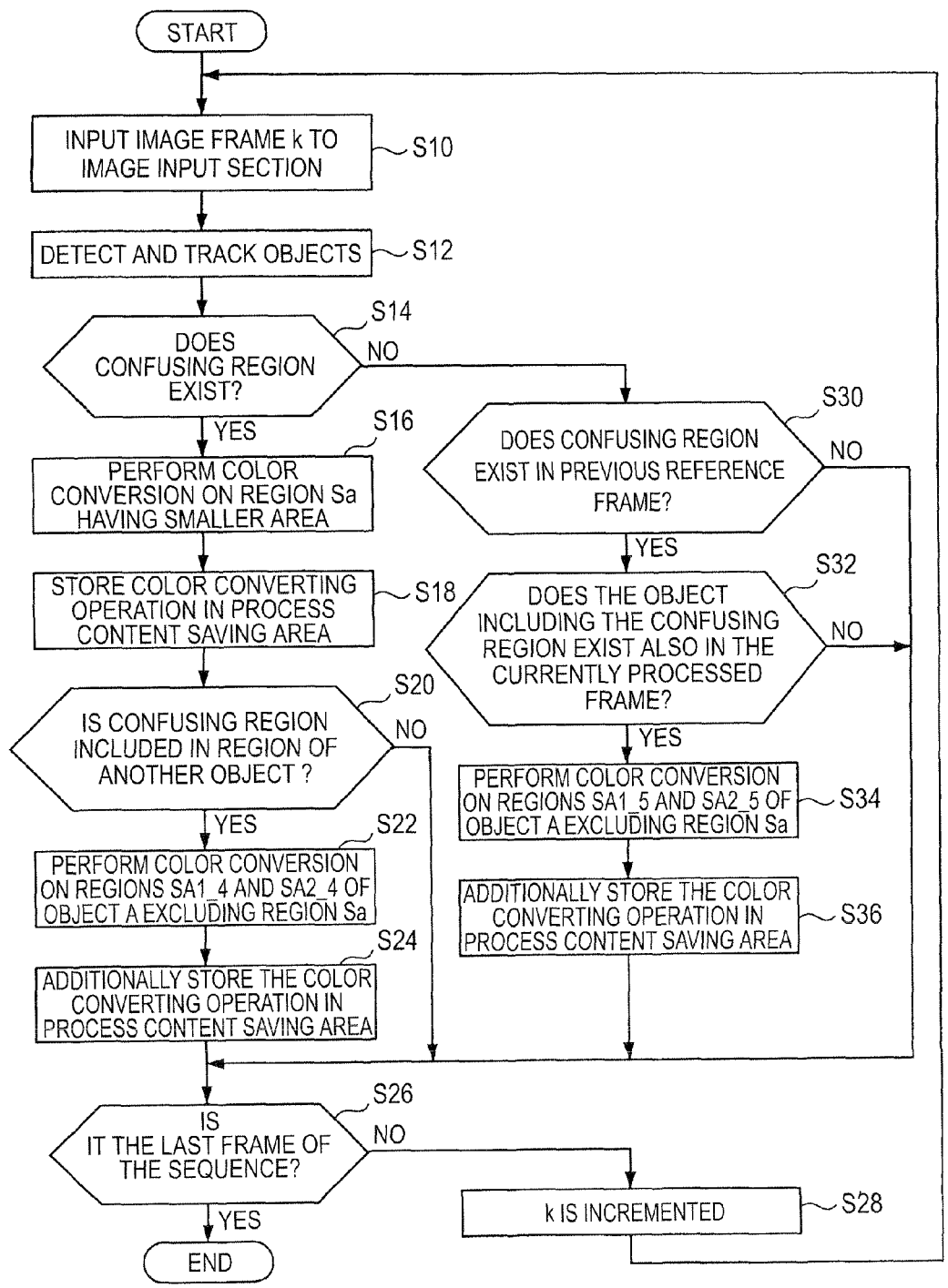
FIG. 2 is a flow chart showing processes performed by the color converting apparatus.

An exemplary color converting process performed by the color converting apparatus 100 will now be described with reference to FIGS. 2 to 4. FIG. 2 is a flowchart of processes performed by the color converting apparatus 100. FIG. 3 is illustrations of frames of a moving image showing sequential movement of an object. First, an image frame as a candidate for conversion is input to the input/output section 102 of the color converting apparatus 100 at step S10 as shown in FIG. 2. Specifically, an image frame k (k-th frame) is input to the input/output section 102.

At step S12, the object detecting portion 112 detects and tracks an object in the image frame k. An object in a frame is divided according to a region detecting method and a region tracking method which are commonly known. An object which exists in a plurality of frames is processed by the object detecting portion 112 such that the object can be tracked, for example, using an object ID uniquely assigned to the same.

FIG. 3 is schematic illustrations of frames of a moving image showing sequential movement of an object. In this case, a moving image having 0-th to seventh frames will be described by way of example, and the 0-th, fourth, and fifth frames of the image are shown in FIG. 3. As shown in FIG. 3, an object A exists in a top left part of the screen in the 0-th frame, and the object A moves to the right and toward the bottom of the screen each time the image proceeds from one frame to the next. Thus, the object A is located in the middle of the screen in the fourth frame, and the object A is located in a right bottom part of the screen in the fifth frame. An object B appears in the fourth and subsequent frames, and the position of the object remains substantially unchanged.

As the input of image frames proceeds as partially illustrated in FIG. 3, the object detecting portion 112 sequentially detects the objects A in the o-th to sixth frames and the object B in the fourth to seventh frames. Pieces of information on the regions occupied by the objects in each frame are obtained as detection results, and such pieces of information are sequentially saved in the temporary storage section 104 as attributes of the objects A and B. Such region information may be specified as "circle" to indicate the shape of the region of interest, and the information may include coordinate information indicating the position of the center of the region and distance information indicating the radius of the region. Such attributes are referred to later by the confusing region bearing object extracting portion 114 to determine whether there is any inclusive relationship between regions.

Referring to FIG. 2, it is determined at step S14 whether the image frame k includes confusing regions whose colors may be confused with each other. The determination of the presence of confusing regions is carried out by the confusing region extracting portion 116 of the calculating section 110. When it is determined at step S14 that there are confusing regions, the flow proceeds to step S16. The flow will now be described based on the example shown in FIG. 2. Let us assume that the objects A and B are detected in the fourth frame shown in FIG. 3 at step S12 and that a region Sa of the object A has a color (e.g., green) which may be confused with the color (e.g., red) of the object B. In this case, it is determined at step S14 that there are confusing regions, and the flow proceeds to step S16.

At step S16, a color converting process is performed on either of the confusing regions, whichever has a smaller area. The color converting process is performed by the color converting portion 118. In the fourth frame shown by way of example, the color of the region Sa of the object A is confused with the color of the entire object B. A comparison between the two regions, the region Sa has a smaller area. Therefore, color conversion is performed in the region Sa having the smaller area at step S16. At this time, the confusing region bearing object extracting portion 114 of the calculation process section 110 determines the object on which color conversion is to be performed based on the positions and sizes of the objects A and B and the areas of the confusing regions.

After step S16, the flow proceeds to step S18 at which the color converting operation performed at step S16 is stored in a process content saving area. In this case, the color converting process performed on the region Sa is stored in the temporary storage section 104 of the color converting apparatus 100. After step S18, the flow proceeds to step S20 at which it is determined whether the confusing regions are included in the region of any other object. In the fourth frame shown by way of example, the region Sa which is a confusing region is included in the region of the object A, and the object A includes a region SA1 and a region SA2 in addition to the region Sa. Therefore, in the case of the fourth frame, the flow proceeds from step S20 to S22. In the fourth frame, the region SA1 is represented by "SA1_4", and the region SA2 is represented by "SA2_4", as shown in FIG. 3. Similarly, in the fifth frame, the region SA1 is represented by "SA1_5", and the region SA2 is represented by "SA2_5".

At step S22, color conversion is performed on the regions SA1_4 and SA2_4 which are regions of the object A excluding the region Sa. At step S24, the color converting process performed at step S22 is additionally stored in a process content saving area provided in the temporary storage section 104 of the color converting apparatus 100. In this case, the color converting process performed on the regions SA1_4 and SA2_4 is additionally stored.

After step S24, the flow proceeds to step S26 at which it is determined whether the current image frame k is the last frame of the sequence of frames of interest. When the image frame k is not the last frame of the sequence, the flow proceeds to step S28 at which the value k is incremented, and the flow returns to step S10 to repeat the processes at step S10 and subsequent steps. When it is determined at step S26 that the image frame k is the last frame of the sequence, the flow of processes is terminated (END).

When it is determined at step S14 that there is no confusing region, the flow proceeds to step S30. The flow will now be described with reference to the fifth frame shown in FIG. 3 by way of example. In the fifth frame shown in FIG. 3, the object A has further moved to the right and toward the bottom of the screen from the position of the same in the fourth frame, and the objects A and B overlap each other. The object A lies behind the object B in an overlapping relationship, and the region Sa that is a confusing region is hidden behind the object B. Since no confusion occurs between the color of the object A excluding the region Sa and the color of the object B, the fifth frame includes no region which can cause color confusion between the objects A and B. Therefore, in the case of the fifth frame shown in FIG. 3, the flow proceeds from step S14 to step S30 as a result of the determination at step S14.

At step S30, it is determined whether a confusing region exists in the frame which has been previously referred to (image frame (k−1)). When a confusing region exists in the image frame which has been previously referred to, the flow proceeds to step S32. When the fifth frame shown in FIG. 3 is processed, since a confusing region (region Sa) exists in the fourth frame which has been previously referred to, the flow proceeds from step S30 to step S32.

At step S32, determination is made on the confusing region which has been determined to exist in the frame previously referred to at step S30 to check whether the object including the confusing region also exists in the frame which is currently processed. At this time, reference is made to the attribute of the object stored in the temporary storage section 104 to determine whether the object exists in the current frame. When the object including the confusing region in the previously referred frame also exists in the currently processed frame, the flow proceeds to step S34. A more specific description will be made with using the fifth frame shown in FIG. 3 as an example. The object A including the confusing region Sa existing in the fourth frame which has been previously referred to also exists in the fifth frame. Therefore, in the case of the fifth frame shown in FIG. 3, the flow proceeds from step S32 to step S34.

At step S34, color conversion is performed on the object to which the confusing region belongs except the confusing region (i.e., color conversion is performed on non-confusing regions of the object). In the case of the fifth frame shown in FIG. 3, color conversion is performed on the regions SA1_5 and SA2_5, excluding the confusing region Sa. At this time, since the color converting process performed on the regions SA1_4 and SA2_4 in the fourth frame has been stored in the temporary storage section 104 at step S24, the content of the process at the step S22 is read out from the temporary storage section 104 at step S34 to perform a color converting process similar to the process at step S22. As thus described, color conversion is performed on the regions SA1_5 and SA2_5 in a manner similar to the process at step S22 also in the fifth frame which includes no confusing region because the region Sa of the object A, which is a confusing region, is hidden behind the object B. Therefore, since color conversion in the regions SA1 and SA2 of the object A is similarly performed in the fourth and fifth frames, it is possible to prevent the image from being perceived by the eyes of a user with a feeling of disorder when the image changes from the fourth frame to the fifth frame.

At the subsequent step or step S36, the color converting process performed at step S34 is additionally stored in the process content saving area of the memory provided in the color converting apparatus 100. When the fifth frame shown in FIG. 3 is processed, the color converting process performed on the regions SA1_5 and SA2_5 is additionally stored.

After step S36, the flow proceeds to step S26 at which it is determined whether the current image frame k is the last frame of the sequence. When the image frame k is not the last frame of the sequence, the flow proceeds to step S28 at which the value k is incremented, and the flow returns to step S10 to repeat the processes at step S10 and subsequent steps. When it is determined at step S26 that the image frame k is the last frame of the sequence, the flow of processes is terminated (END).

Figure 4:
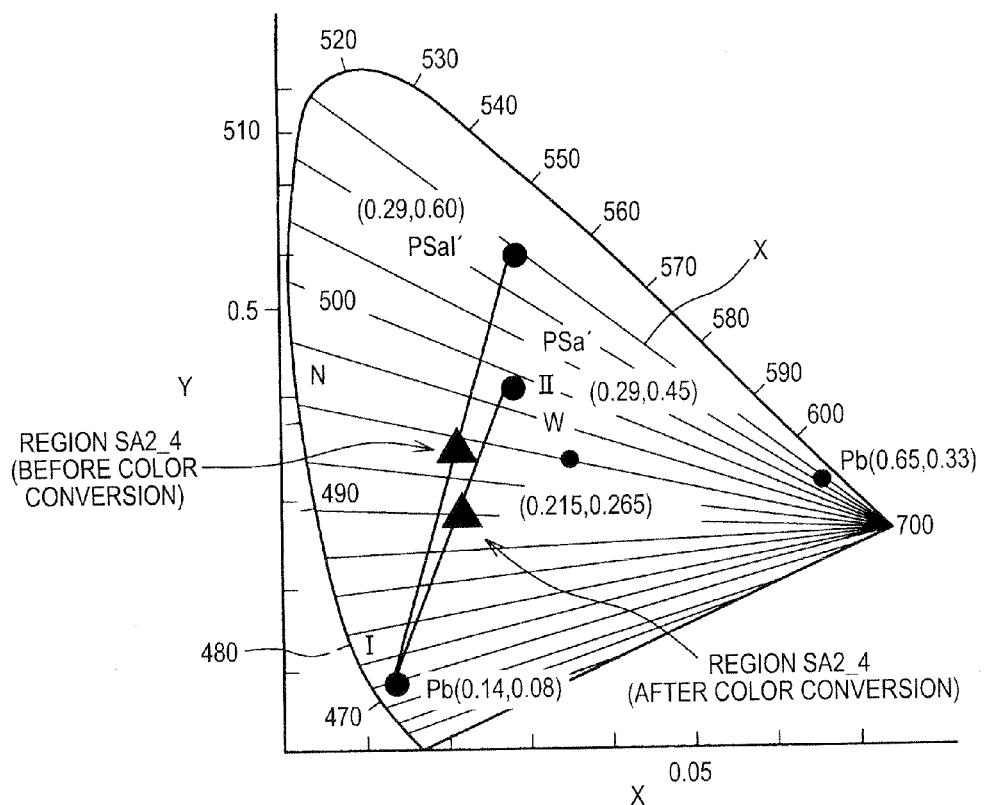
FIG. 4 shows characteristics of the colors of the objects A and B in FIG. 3 plotted on a CIE xy chromaticity diagram.

FIG. 4 shows characteristics of the colors of the objects A and B in FIG. 3 plotted on a CIE (Commission Internationale d'Eclairage) xy chromaticity diagram. For example, the chromaticity diagram shown in FIG. 4 is similar to FIG. 5 of the above-mentioned Patent Document 2. A range of colors is plotted in the form of a sector, the colors being shown in the descending order of their wavelengths when the plot is checked counterclockwise. Each straight line (confusing line) shown on the chromaticity diagram of FIG. 4 is a straight line plotted according to the CIE xy chromaticity diagram which represents such hue and saturation information that two colors on the same straight line are perceived as different colors by a person having C-type color vision and perceived as identical colors by a personal having P-type color vision when the colors are adjacent to each other. It is difficult for a person having a color vision problem to distinguish between two colors located on such a straight line which are adjacent to each other in terms of hue and saturation information.

Let us assume that the object A in each frame shown in FIG. 3 is a colored object which has an object boundary detected in the form of a clear contour or contrast and which has gradation between the domains of blue and green. As shown in FIG. 3, the object A is colored such that it is gradated from blue to green in the top-left to bottom-right direction of the screen. The object B is uniformly colored in red.

A more specific description will be made using the CIE xy chromaticity diagram shown in FIG. 4. The object A is colored with gradation provided by colors on the straight line I-I' extending between a point PbI (0.14, 0.08) in the domain of blue and a point PSa (0.29, 0.60) in the domain of green in the CIE xy chromaticity diagram. The region SA1 shown in FIG. 3 corresponds to the point Pb1, and the region Sa corresponds to the point PSa. The object is gradated from the color of the region SA1 toward the color of the region Sa, i.e., gradated along the straight line I-I' from the color represented by the point Pb1 toward the color represented by the point PSa. The object B as a whole has a color represented by a point Pb (0.65, 0.33) shown in FIG. 4.

Since the points PSa and Pb are located on a confusing line X as shown in FIG. 4, the region of the object A having the color PSa and the region of the object B having the color Pb may be confused with each other by a person having P-type color vision. However, the region of the object A does not reside on the confusing line X except the region Sa, and the region is out of a MacAdam ellipse which is generally known as a threshold for a color difference. Therefore, the region has such a hue that it will not be determined as a confusing region even when it resides near the object B.

As described above, the confusing regions in the fourth frame are detected by the confusing region detecting portion 116 at step S14 shown in FIG. 2. Let us designate the confusing regions of the objects A and B by respective reference marks "Sa4" and "Sb4" having a suffix representing the frame number. The region Sa4 is a region of the object A in a bottom right part thereof, and the region Sb4 is a region which is equal to the object B as a whole.

When the confusing regions Sa4 and Sb4 in the fourth frame are detected, color conversion is performed on the confusing regions by the color converting portion 118. In this case, color conversion is performed on the region Sa4 which has a smaller area according to the magnitudes of the areas of the confusing regions as described above to avoid confusion (step S16). That is, color conversion is not performed on the region Sb4 of the object B.

Let us assume that the region Sa in the fourth frame corresponds to one gradational step and that the region is uniformly colored in the color represented by the point PSa shown in FIG. 4. FIG. 4 shows chromaticity coordinates associated with color converting operations performed by the color converting portion 118. As a result of a color converting operation of the color converting portion 118 as shown in FIG. 4, the gradate color of the object A represented by the straight line I-I' is converted into gradated color represented by the straight line I-II. Specifically, a color converting operation performed on the region Sa in the fourth frame is a process of changing a color represented by the point PSa in the CIE xy chromaticity diagram in FIG. 4 into a color represented by a point PSa' in the graph. That is, color conversion corresponding to a movement of 0.15 in the negative y direction of the diagram is performed to change the color of the region into the color represented by the point PSa'=(0.29, 0.45). Let us call the operation "color converting operation ja0". The color converting operation ja0 is recorded in the process content saving area of the temporary storage section 104. When combined with processes performed at step S22 to be described later on regions of the object neighboring the region Sa, the above-described operation allows the color of the object to be converted with a feeling of disorder suppressed. Since the color of the object is smoothly gradated in the range from the region SA1 to the region Sa, the embodiment allows a feeling of disorder attributable to color conversion can be more effectively suppressed compared to a color converting operation performed only on the region Sa.

FIG. 5 is a table showing various states of each of frames including those shown in FIG. 3, i.e., the state of a confusing region presence flag, the result of confusing region extraction performed by the confusing region extracting portion 116, and the result of tracking of the objects A and B performed by the object detecting portion 112. The confusing region presence flag represents the result of determination performed in each frame by the confusing region extracting portion 116, and the flag is set at "1" when a confusing region exists and set at "0" when no confusing region exists. Since the objects A and B include confusing regions only in the fourth frame as shown in FIG. 3, the confusing region presence flag is set at "1" for the fourth frame and set at "0" for the other frames.

As a result of confusing region extraction performed by the confusing region extracting portion 116, confusing regions belonging to the objects A and B are extracted from the fourth frame. The result of tracking performed by the object tracking portion 112 indicates that the object A exists in the screen in the 0-th to sixth frames and that the object B exists in the screen in the fourth to seventh frames.

At step S20 shown in FIG. 2, the confusing region bearing object detecting portion 114 employing commonly known methods for dividing, re-sorting and merging image regions performs detection and determines that the confusing region Sa is included in the object A and that the region Sb is included in the object B. That is, it is determined that the following relationships are true.

$$A = \{Sa, SA1, SA2\}$$

$$Sa \subset A$$

$$Sb = B$$

In the fourth frame, a color converting process is also performed on the rest of the object A or the regions SA1_4 and SA2_4 to allow the object A to be continuously colored (step S22 in FIG. 2). Since the object A is colored with gradation as represented on the CIE xy chromaticity diagram of FIG. 4 as described above, the process performed on the regions SA1_4 and SA2_4 is a process of converting the hue of each point described when primary conversion is performed to convert the straight line I-I' connecting the points Pb1 and PSa into the straight line I-II connecting the points Pb1 and PSa'. More specifically, the color of the region SA1_4 is kept equal to the color represented by the point Pb1, and the color of the region SA2_4 is converted into a color represented by a point (0.215, 0265) on a straight line connecting the point Pb1 and a point Psa' (0.29, 0.45). This color converting operation is also additionally stored in the temporary storage section 104 at step S24.

As described above, when the processing of the fourth frame is finished, the flow returns to step S10 in FIG. 2 to process the fifth frame shown in FIG. 3. In the fifth frame, the region Sa of the object A disappears because it is hidden behind the object B. At this time, as shown in FIG. 5, the object detecting portion 112 detects the objects A and B, and confusing region determination carried out by the confusing region extracting portion 116 results in an answer "None".

Thus, the flow of processes shown in FIG. 2 proceeds from step S14 to step S30 to perform processes at step 30 and subsequent steps. Specifically, it is determined whether to perform color conversion based on the state of the confusing region presence flag of the frame (fourth frame) which is being referred to and the result of extraction of the objects A and B. In the case of the fifth frame, the state of the confusing region presence flag of the preceding frame or the fourth frame which is being referred to is "1" (step S30), and both of the objects A and B are detected by the process performed on the fifth frame (step S32). Therefore, the record of the color converting operation performed on the fourth frame is read out from the process content saving area of the temporary storage section 104, and a color converting process is performed on the region SA1_5 and a part of the region SA2_5 in the object A which are not hidden by the object B by referring to the record (step S34).

The above-described process is similarly performed on subsequent frames. Specifically, even when the confusing region extracting portion 116 determines that the current frame includes no confusing region, detection is performed to acquire the result of extraction of a confusing region carried out on a reference frame and information on an object including the confusing object. When objects detected in the currently processed frame includes an object identical to the object in the reference frame which has included a confusing region, color conversion is performed on the object in the current frame excluding the confusing region. In an arbitrary image frame k, hue conversion similar to that applied to a confusing region is performed on regions SA1_k and SA2_k which are included in the object A and which are not included in the region Sa by referring to the process content saving area.

A case in which in the fifth frame, the region Sa is hidden behind the region Sb has been described above by way of example. A similar process is performed on the fifth frame even when the confusing region disappears in the fifth frame as a result of such a movement of the object A that the region Sa exits the screen.

For simplicity of description, the above embodiment has been described on an assumption that the object A is colored with gradation having three steps such that the color of the object A is plotted in the form of a straight line on a CIE xy chromaticity diagram. Color conversion and processing of brightness can be carried out according to the embodiment even for an image which is colored with finer and more complicated gradations or an image in which the effect of complementary colors or contrast is utilized in the same object. In this case, a record of image processing or a color converting process applied to a frame including a confusing region may be utilized when a color converting process is performed on another frame in a manner as described above.

In the above-described embodiment, the last frame preceding the currently processed frame is used as a reference frame, and a process of converting the color of the succeeding frame is performed by referring to the result of detection of an object including a confusing region carried out in the preceding frame. An older frame in the same moving image sequence may alternatively be chosen as a reference frame. In the example shown in FIG. 3, the object B does not exist in the 0-th to third frames, and no confusing region exists in those frames. However, color conversion may be performed on the object A in the 0-th to third frames based on the result of detection of a confusing region carried out in all frames. In this case, the extraction of an object including a confusing region and the detection and tracking of objects may be carried out for all image frames of the sequence of interest. Thereafter, a color conversion process may be performed on regions Sa_k, SA1_k, and SA2_k of the object A in the 0-th to third frames by referring to the color converting operation performed on the fourth frame.

As described above, when the embodiment is applied to a moving image sequence including a combination of colors difficult to distinguish for a person having anomalous color vision, even if one image frame of the sequence includes no confusing hue, color conversion is performed on the image frame when the image frame preceding or succeeding the frame of interest includes a hue which can be confused with another. Thus, color conversion is applied to the consecutive moving image frames such that continuity between hues can be temporally and spatially maintained throughout the sequence. It is therefore possible to reliably prevent a moving image from being visually perceived at degraded quality because of discontinuous transitions between hues.

While the embodiment of the present disclosure has been described in detail with reference to the appended drawings, the present disclosure is not limited to this. It should be understood by those skilled in the art that various changes and modifications can be made within the scope of the technical concept described in the appended claims and such changes and modifications belong within the scope of the present disclosure.

The present disclosure contains subject matter related to that disclosed in Japanese Priority Patent Application JP 2010-121670 filed in the Japan Patent Office on May 27, 2010, the entire contents of which is hereby incorporated by reference.

What is claimed is:

1. A color converting apparatus comprising:
    an input section acquiring image data of moving image content from each frame;
    an object detecting section detecting an object from the image in each frame;
    a confusing region extracting section extracting a confusing region having a confusing hue from the detected object; and
    a color converting section performing color conversion at least on a region including the confusing region in a particular frame or another frame including the object from which the confusing region has been extracted, when the confusing region is extracted from the particular frame.

2. A color converting apparatus according to claim 1, further comprising
    a color converting process storing section storing the content of the color converting process performed on the particular frame, wherein
    the color converting section uses the process content stored in the color converting process storing section when performing the color conversion on the other frame.

3. A color converting apparatus according to claim 1, further comprising
    an object storing section storing an object in the particular frame on which the color conversion has been performed, wherein
    the color converting section performs the color conversion on the other frame when the object stored in the object storing section exists in the other frame.

4. A color converting apparatus according to claim 1, wherein:
    the confusing region extracting section extracts the confusing regions having hues which can be confused with each other from respective objects among a plurality of objects detected by the object detecting section,
    the apparatus including a confusing region bearing object extracting section extracting an object to be subjected to color conversion from among the plurality of objects based on the size of the confusing region in each of the objects,
    the color converting section performing color conversion on the object extracted by the confusing region bearing object extracting section among the plurality of objects.

5. A color converting apparatus according to claim 1, wherein the color converting section performs the color conversion on the confusing regions having hues which can cause mutual confusion between objects such that the confusing regions do not reside on the same confusing line on an xy chromaticity diagram.

6. A color converting method comprising:
    acquiring image data of moving image content from each frame;
    detecting an object from the image in each frame;
    extracting a confusing region having a confusing hue from the detected object;
    performing color conversion at least on a region including the confusing region in a particular frame when the confusing region is extracted from the particular frame; and
    performing color conversion at least on a region including the confusing region in another frame including the object from which the confusing region has been extracted.

7. A non transitory computer readable medium storing a program for causing a computer to function as:
    module for acquiring image data of moving image content from each frame;
    module for detecting an object from the image in each frame;
    module for extracting a confusing region having a confusing hue from the detected object; and
    module for performing color conversion at least on a region including the confusing region in a particular frame or another frame including the object from which the confusing region has been extracted, when the confusing region is extracted from the particular frame.

* * * * *